UNITED STATES PATENT OFFICE.

CARL ADOLPH SAHLSTRÖM, OF JÖNKÖPING, SWEDEN, ASSIGNOR TO THE NORMAL COMPANY, (LIMITED,) OF WESTMINSTER, ENGLAND.

PROCESS OF EXTRACTING OIL FROM MARINE ANIMALS.

SPECIFICATION forming part of Letters Patent No. 353,823, dated December 7, 1886.

Application filed November 1, 1886. Serial No. 217,721. (No specimens.) Patented in England December 5, 1882, No. 5,787; in Denmark May 1, 1886, No. 559; in Belgium May 21, 1886, No. 73,210, and in Italy September 30, 1886, No. 20,021.

*To all whom it may concern:*

Be it known that I, CARL ADOLPH SAHLSTRÖM, a subject of the King of Sweden, residing at Jönköping, in the Kingdom of Sweden, engineer, have invented certain new and useful Improvements in the Treatment of the Flesh or Material of Fish, Whales, and other Sea Animals to Obtain Useful Products Therefrom, (for which Letters Patent in Great Britain, No. 5,787, dated the 5th day of December, 1882, have been granted to Lorentz Albert Groth, of 30 Finsbury Pavement, London, England, as a communication to him from me; and for which Letters Patent in Denmark, No. 559, dated May 1, 1886, were granted to Thorsten Nordenfelt, of 53 Parliament Street, in the city of Westminster, England, civil engineer, as my assignee; and for which Letters Patent in Belgium, No. 73,210, dated May 21, 1886, and in Italy, No. 20,021, dated September 30, 1886, were granted to the Normal Company, (Limited,) of 52 Parliament Street, in the city of Westminster, England, as my assignees;) and I do hereby declare that the following is a full, clear, and exact description of the invention, which will enable others skilled in the art to which it appertains to make and use the same.

The object of this invention is the utilization of the shark, whale, seal, and other sea animals and some kinds of fish and the offal arising from the curing and drying of cod and other fish and the production therefrom of oil and fat. For this purpose the raw material, which should be of a fatty nature, is cut up into as small pieces as possible by mechanical means, and is placed in a vat provided with stirring apparatus. A quantity of clean water, free from lime, is boiled and cooled down to from 6° to 15° centigrade, and to this is added so much dissolved hypermanganic alkali as will impart to the water a light-red color, (say from one to ten grams for every one hundred liters of water,) and from twenty to one hundred grams of ammonia. Sufficient of this liquor is added to the finely-cut raw material to give thereto the consistence of thin gruel, and the stirring apparatus is then set to work. After a period of from ten to thirty minutes the mass is removed from the vat and is placed in a centrifugal apparatus for the purpose of separating the liquor, which carries the fat with it.

The inner part of the centrifugal apparatus is preferably covered with cloth. When all the fluid is separated, the mass is again soaked in fresh liquor and passed through the centrifugal apparatus, and this is done as often as may be found necessary to remove all the fat. All the fluid obtained is mixed together and left to stand in a deep tank for a period varying according to the temperature and until complete separation takes places. The fat and oil rise to the top of the liquid, and are removed for further treatment. The fat obtained as above described is heated to 60° or 80° centigrade, whereby the bursting of the membranes covering the microscopical balls of fat is effected, and the oil flows out in clear and pure state. It is then left to stand in deep vessels, in order that the solid matter may settle to the bottom, leaving the oil perfectly clear, with scarcely any taste or smell, and applicable to the most delicate uses.

Having now particularly described and ascertained the nature of my said invention and in what manner the same is to be performed, I declare that what I claim is—

Producing a tasteless and colorless oil from fish, whales, seals, and other sea animals by cutting up the raw material, washing out the fat with cold water to which has been added ammonia or other suitable alkaline matter and a disinfectant, such as hypermanganic alkali, and then applying sufficient heat to liberate the oil, substantially as hereinbefore described.

CARL ADOLPH SAHLSTRÖM.

Witnesses:
 WILL. MITCHELL, Jr.,
  *Writer, 1 Adelphi, Aberdeen.*
 G. MAIR HOOD,
  *Solicitor, 1 Adelphi, Aberdeen.*